United States Patent Office 3,365,280
Patented Jan. 23, 1968

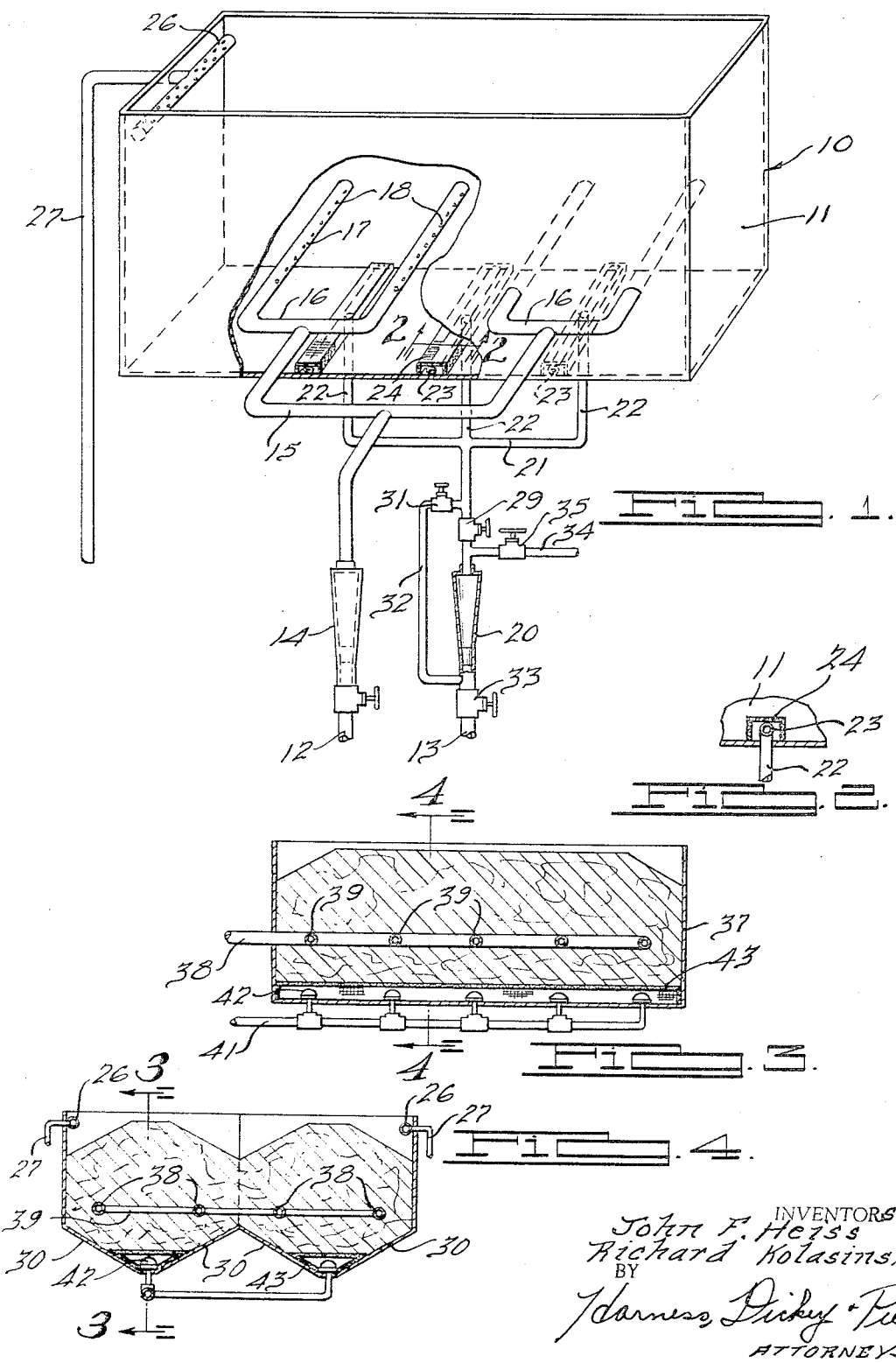

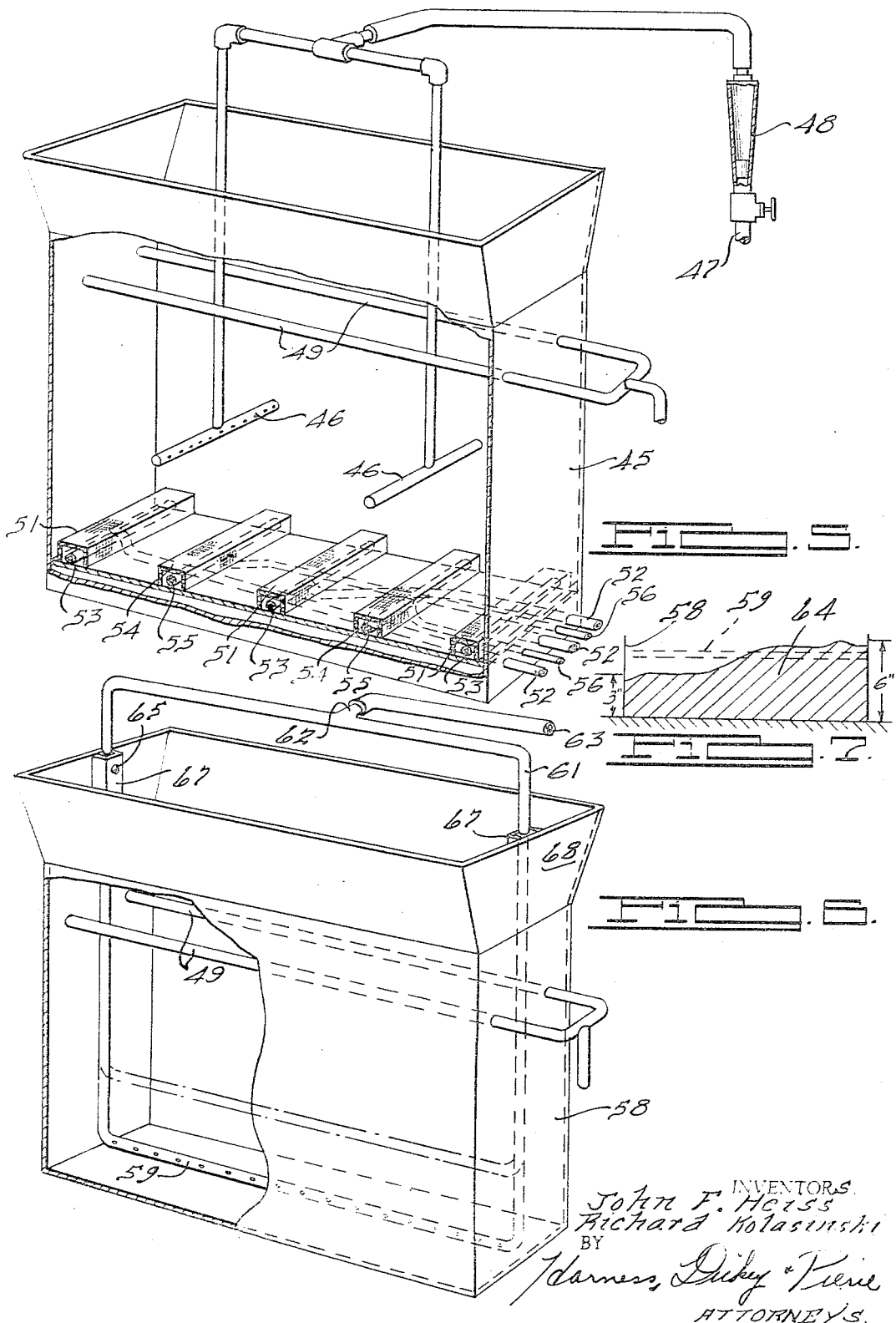

3,365,280
METHOD AND APPARATUS FOR
PRODUCING BRINE
John F. Heiss, St. Clair, and Richard Kolasinski, Richmond, Mich., assignors to Diamond Crystal Salt Company, St. Clair, Mich., a corporation of Michigan
Filed Mar. 8, 1965, Ser. No. 437,966
9 Claims. (Cl. 23—312)

ABSTRACT OF THE DISCLOSURE

A rock salt dissolver apparatus wherein the flow of dissolving water through the apparatus is split in two paths, the first path comprising the flow of the major portion of the dissolving water through the salt bed and with the water for said first path being introduced at an intermediate level within the dissolver and above the accumulated sludge at the bottom of the dissolver vessel, and the second path comprising the flow of a minor proportion of the total dissolving water upwardly through said accumulated sludge at the bottom of the salt bed and outlet means at the top of the apparatus for removing the brine; and, the method for dissolving rock salt utilizing said apparatus and comprising the steps of positioning the rock salt in a vessel to form a salt bed, then introducing the major portion of the total dissolving water to the bed at a first intermediate level above the bottom surface of the vessel, causing the flow of a minor portion of the total dissolving water upwardly through the sludge accumulated at the bottom of the vessel, and then withdrawing the major portion of the brine product from a level near the top of the vessel.

---

This abstract is for convenience purposes only for use in searching of the technical literature, etc., and it should not be construed in any way as a limitation on the invention described hereinafter.

This invention relates to improved methods for dissolving rock salt in a pit-type dissolver to produce low-content calcium sulfate brines and improved apparatus suitable for use in the method.

In the production of brine from rock salt for such uses as the raw material for chemical processing, it is conventional to use pit-type dissolvers in which the water is introduced in the bottom of the pit, flows upwardly through the salt and the product brine is taken off at the top of the pit. Alternately, the water is introduced at the top of the pit, flows downwardly through the salt bed and is taken out through a porous tile or the like at the bottom of the pit. Under either procedure, the entire flow of water or brine passes through the bed of sludge, containing some undissolved salt and a high concentration of $CaSO_4$, anhydrite, which accumulates at the bottom of the pit. As the dissolving operation continues, the depth of the sludge continues to increase and is usually removed periodically, either by hand or with mechanical means. Ordinarily, the calcium sulfate content of the product brines heretofore produced gradually increases as the pit-type dissolver is used and the depth of the sludge in the bottom portion thereof continues to increase, and the necessity for cessation of the dissolving operation to permit clean-out of the sludge is controlled by the maximum calcium sulfate content that can be tolerated in the product brine for specific end uses.

The improved method of this invention is based on the discovery that a substantially improved low calcium sulfate content brine, that is, a brine containing lower calcium sulfate than is ordinarily obtained from pit-type dissolvers, can be produced in a pit-type dissolver by splitting the flow of the dissolving water into two paths; the first path comprising the flow of the major portion of the dissolving water through the salt bed but not through the accumulated sludge at the bottom of that bed, and the second path comprising the flow of a minor proportion of the total dissolving water through the sludge. The method contemplates that the second path containing the minor quantity of liquid flow may constitute an upflow of fresh water through the sludge, or the withdrawal of a minor quantity of fresh water, or dilute brine through the sludge bed, and in both forms the major portion of the brine is withdrawn from a location near the top of the pit. The preferred form of the invention comprises the introduction of the major portion of the dissolving water at a location spaced above the bottom of the receptacle and most preferably above the upper level of the sludge for upflow through the salt bed, and the introduction of a minor proportion of the total dissolving water as fresh water at the bottom of the pit to flow upwardly through the sludge to thereby dissolve the remaining undissolved salt and thereafter flow upwardly through the salt bed with all of the product brine being removed from near the top of the bed. In a modified form of the method of this invention that is especially adapted for continuous lengthly operation, the location of the fresh water supply for the major portion of the dissolving water is adjusted continually or periodically to remain above the level of the top of the sludge bed as the process is continued and the sludge bed increases in depth. The invention also contemplates apparatus for performing these methods.

Accordingly, the main objects of the invention are: to provide a method of dissolving rock salt in a pit-type dissolver to thereby produce a lower calcium sulfate content product brine than was heretofore obtainable from conventionally operated pit-type dissolvers; to provide a split flow pit-type rock salt dissolver equipped with means to establish separate paths of flow of the major portion of the dissolving water through the salt bed only and a minor portion of the water or dilute brine through the sludge layer at the bottom of the dissolver; to provide a pit-type rock salt dissolver having a manifold for dissolving water, adjustable in location relative to the bottom of the dissolver and adapted for positioning at progressively higher locations as the dissolving process is continued; and to provide a method and apparatus for producing low calcium sulfate content brine from rock salt in a pit-type dissolver which is simple in construction, and easy to control during operation to obtain low calcium sulfate-containing product brine over extended periods of time.

Other objects, features and novelty of the invention will be specifically pointed out or will become apparent when referring, for a better understanding of the invention, to the following description, taken in conjunction with the accompanying drawings wherein:

FIGURE 1 is a perspective view, with parts broken away, of a pit-type dissolver embodying features of this invention;

FIGURE 2 is a sectional view of the structure illustrated in FIGURE 1 taken on the line 2—2 thereof;

FIGURE 3 is a sectional view of the pit-type dissolver shown in FIGURE 4 and taken on the line 3—3 thereof;

FIGURE 4 is a sectional view of the structure illustrated in FIGURE 3 taken on the line 4—4 thereof;

FIGURE 5 is a perspective view, with parts broken away, and showing a modified form of the invention;

FIGURE 6 is a perspective view, with parts broken away, and illustrating a positionable water manifold; and FIGURE 7 is a broken sectional view of the bottom of the tank shown in FIGURE 6 to illustrate the build-up of sludge as a function of velocity of upflow of the dissolving water.

Broadly stated, the method of this invention comprises the steps of positioning rock salt in a receptacle to form a salt bed, introducing the major portion of the total dissolving water to the salt bed at a level spaced upwardly from the bottom of the receptacle for up-flow toward the product brine exit positioned near the top of the receptacle, and causing the flow of a minor portion of the total dissolving liquid through the portion of the salt bed beneath the level of introduction of the major portion of the dissolving liquid, and withdrawing the major portion of the product brine from near the top of the receptacle. A lower calcium content product brine is produced, relative to that produced from the heretofore known conventional procedures, so long as the total dissolving water fed to the bed is split between the two levels mentioned above. The quality of the resultant brine is substantially directly related to the proportion of dissolving liquid fed to the bed at a level spaced above the bottom of the receptacle relative to the proportion of dissolving water which flows through the collected sludge supported on the bottom surface of the receptacle. While some improvement is attained when the broad principle of splitting flow of dissolving water between the two levels is employed, substantially improved results are attained when the major portion of the total dissolving water, that is, more than 50%, is introduced to the salt bed through a manifold located substantially above the bottom surface of the receptacle. Better results are obtained when at least about 90% of the total dissolving water is introduced in the upper manifold and the balance of the liquid flow moves only through that portion of the bed located beneath the level of the upper manifold. Excellent results have been attained when the quantity of liquid flow in the portion of the bed located beneath the upper manifold is between 2% and 8% of the total dissolving liquid, and the best results for commercial purposes are obtained when the upper manifold supplies about 95% of the total dissolving water and about 5% of the total dissolving water passes either upwardly or downwardly through that portion of the bed located beneath the level of the upper manifold.

Referring to FIGURES 1 and 2, a pit-type dissolver is illustrated but it is to be understood that the expression "pit-type dissolver" is intended in its generic sense to include a pit located beneath the surface of the earth, a tank, tank car, or other receptacle physically located above the surface of the earth. The dissolver 10 comprises a tank 11 equipped with two series of interconnected conduits, one set leading to a location above the lower surface of the tank and another set leading to openings positioned adjacent to the lower surface of the tank. The first set includes pipe 12, rotameter 14 and intermediate piping connected to a U-shaped conduit 15 terminating at each end of its bifurcation in U-shaped manifolds 16 which extend transversely across the tank 11 and at a location substantially above its bottom surface. The transversely extending arms 17 of the manifolds 16 are provided with a plurality of apertures 18 through which water is ejected and the liquid flowing through pipe 12 constitutes the major portion of the dissolving water for the salt that is positioned in tank 11. The second set of piping comprises conduit 13, rotameter 20 and interconnecting conduit attached to feeder line 21 which terminates in three spaced branches 22, the upper ends of which are attached to feeder manifolds 23, of similar construction to that of arms 17. Each of the manifolds 23 is covered by a channel-shaped screen to protect the apertures in manifolds 23 from clogging as the sludge develops in the bottom of the tank 11. This second set of piping also include valves 29, 31, by-pass line 32, brine delivery conduit 34 and valve 35, the functioning of which will be explained in greater detail subsequently. The apparatus of FIGURE 1 is suitable for use in practicing both forms of the method of this invention, and in either case, the major portion of the product brine is removed from the tank 11 through manifold 26 and conduit 27.

In use, tank 11 is filled with rock salt to the desired level and in all cases the salt bed extends well above the level of the manifolds 16 and arms 17. In one form of the method of this invention the major portion of the dissolving water, for example, 90%–98% of the total water, is supplied through conduit 12, its rate of flow being controlled by rotameter 14, and that water which exits from apertures 18 flows upwardly through the overlying salt bed toward product brine manifold 26. A minor portion of the water, for example, 2%–10% of the total water, is supplied through conduit 13 and manifolds 23, and this water also moves upwardly through the overlying sludge and salt bed and joins with the brine being produced in the upward travel of the major flow of water from manifolds 16, with the product brine being continuously withdrawn through manifold 26 and conduit 27.

In the other form of the method of this invention, the major portion of the dissolving water is supplied through conduit 12 and fed to the salt bed through manifolds 16 and moves upwardly through the overlying salt bed toward the product brine manifold 26. The second set of piping comprising branches 22, connecting feeder line 21 and rotameter 20 are employed to withdraw a minor proportion of liquid, for example, 2%–10% of the total, on a continuous basis, and this is accomplished by closing valves 29 and 33, opening by-pass valve 31 and valve 35, thus forcing the flow of withdrawn liquid through rotameter 20 so that the quantity thereof can be continuously measured relative to that flowing through the supply line 12. It is to be understood that the particular means shown to effect continuous control of the quantity of flow is representative only and that other suitable flow-controlling arrangements and means may be employed.

When using either form of the method of this invention, the rate of upward flow of the dissolving liquid through the salt bed should be controlled such that the velocity of the brine in the interstices between the adjacent salt particles is sufficiently low to permit anhydrite, or calcium sulfate, particles exposed as the salt particles dissolve to migrate downwardly to the bottom of the tank. In order to attain the primary objective of this invention of producing low calcium content brine the calcium sulfate particles must settle through the bed rather than be lifted upwardly by the velocity of the upflowing liquid toward the product brine manifold 26. One of the advantages of the second form of the method of this invention is that the liquid which moves hrough the accumulated anhydrite bed is moving in a downward direction and the fine calcium sulfate particles thus tend to be compressed on the lower surface of the tank rather than agitated and moved into the liquid flowing upwardly above the level of the manifolds 16. However, when the second set of piping 13, 20, 21, 22, 23 is used to add fresh water as a minor portion of the total water being fed to the salt bed, it is relatively simple to adjust the proportion of the total added therethrough such that the rate of flow through the accumulated anhydrite-containing sludge does not result in sufficient agitation thereof to cause the calcium sulfate to rise from the lower surface of tank 11, or become a part of the product brine.

Using the aparatus of FIGURES 1 and 2, the two forms of the method of this invention were compared in the following comparative operations: In both tests, tank 11 was filled with No. 1 Louisiana rock salt to a level somewhat below the level of concentrated brine exit manifold 26 and maintained by addition from the top of the tank during the dissolving operation. In the first test, 95% of the total water was introduced through supply line 12, rotameter 14 and connected piping, while 5% of the total water was introduced through supply line 13, rotameter 20 and connecting piping, with all of the brine being removed through manifold 26 and conduit 27. At the beginning of the dissolving operation the product brine contained 130 parts per million of calcium sulfate. After 200 lbs. of salt had been dissolved the product brine contained 255 p.p.m. of calcium sulfate, whereas after 400 lbs. of salt had been dissolved the product brine contained 240 p.p.m. of calcium sulfate.

In the second test, all of the dissolving water was introduced through feed line 12, rotameter 14 and connected piping, and 5% of the brine was withdrawn through manifolds 23, branches 22, 21, through by-pass line 32, upwardly through rotameter 20 and outwardly through delivery conduit 34, valves 29 and 33 having been closed and valves 31 and 35 having been opened to obtain the desired flow rate. The balance of the product brine was removed through manifold 26 and conduit 27. At the beginning of the test, the product brine removed from manifold 26 contained 81 p.p.m. calcium sulfate, while that removed from conduit 34 contained 115 p.p.m. calcium sulfate, the blend of the two product lines containing 83 p.p.m. calcium sulfate; after 200 lbs. of salt had been dissolved the brine from manifold 26 contained 128 p.p.m. calcium sulfate, while the brine from conduit 34 contained 822 p.p.m. calcium sulfate with the blend of the blend of the two product lines containing 163 p.p.m. calcium sulfate. After 400 lbs. of salt had been dissolved the brine from manifold 26 contained 222 p.p.m. of calcium sulfate, the brine from conduit 34 contained 1332 p.p.m. calcium sulfate and the blend contained 288 p.p.m. calcium sulfate.

In both tests, the rate of liquid flow through the salt bed was 0.8 gallon per minute per square foot of the salt bed.

For comparison purposes the same apparatus was employed in performing the conventional method of using a pit-type dissolver by introducing all of the water through feed line 13, rotameter 20 and connected piping. This dissolving operation was performed in the dissolver immediately following the conclusion of the second test as above described. At the start, with a flow rate through the salt bed of 0.8 g.p.m. per sq. ft., the product brine contained 515 p.p.m. calcium sulfate. To demonstrate the effect of the flow rate on the calcium sulfate content of the product brine, the flow rate was reduced to 0.4 g.p.m. per sq. ft. after 200 lbs. of salt had been dissolved and this was maintained for the dissolving of the next 200 lbs. of salt and during this time the product brine contained 662 p.p.m. calcium sulfate. Another change in flow rate was made to 0.2 g.p.m. per sq. ft. after 400 lbs. of salt had been dissolved, and the product brine contained 656 p.p.m. calcium sulfate. In these tests, the apparatus of FIGURE 1 was a transparent plastic tank 18″ long, 3¾″ wide and 9″ deep, with manifolds 16 being located 3″ from the bottom of the tank and manifolds 23 being positioned such that vertical planes extending upwardly therefrom were equally spaced from arms 17. These tests illustrate the degree of improvement in the quality of the brine which results from the split flow operation method of this invention.

The apparatus of FIGURES 3 and 4 illustrate a typical form of the pit-type of dissolver that is used in commercial operations. The dissolver of FIGURES 3 and 4 provided with sloping bottom portions 30 which aid in collecting the calcium sulfate sludge which is formed during continuous operation of the dissolver. The tank, or pit, 37, is provided with a supply conduit 38, equipped with a plurality of manifolds 39 which extend across the bed, these manifolds being provided with a plurality of apertures for distributing the dissolving water through the salt bed. The salt bed is supported on screens 43 which serve to protect spray heads 42 which are positioned at the apex of the sloping bottom portions 30. Each spray head 42 is attached to conduit 41 and these heads may be used to supply water to the tank or pit 37 or to withdraw a portion of the product brine therefrom in a comparable fashion to that discussed above for the second set of piping 13, 20, etc. of FIGURE 1. In commercial use of the dissolver illustrated in FIGURES 3 and 4, the salt to be dissolved is continuously fed through the dissolver from the top and the salt bed normally assumes the approximate shape shown in FIG. 4, with the product brine being withdrawn from manifolds 26 and conduit 27. It has been found that low calcium sulfate content brine continues to be produced from a dissolver of the type illustrated in FIGURES 3 and 4 until the depth of the calcium sulfate-containing sludge approaches or covers the main water supply conduit 38 and manifolds 39. As the sludge bed thickens to this extent the calcium sulfate content of the product brine increases and the operation of the dissolver is normally discontinued and the sludge removed.

In using either form of the method of this invention, it was established that the calcium sulfate-containing sludge tends to build up immediately beneath the manifold which supplies the major portion of the water to the dissolver. When the pit-type dissolver is large in its dimensions and the main water manifolds are spaced apart substantial distances, the sludge is not uniformly distributed over the bottom of the pit and in such installations it is preferable to decrease the space between these main dissolving water manifolds. The over-all efficiency of the dissolver and method is thereby enhanced by virtue of increasing the time during which the dissolver may be used before the sludge level reaches the lower level of the main water dissolving manifold 38, 39 and the maximum quantities of high quality, low calcium sulfate-content brine can be produced between clean-outs.

It has been established that the relative locations of the main water dissolving manifold and the manifolds which supply fresh water to the bottom surface of the pit or remove a portion of the brine from the same location has an effect on the calcium content of the product brine. Better results are obtained when the manifolds supplying the minor quantity of water to the bottom surface of the pit are located directly beneath the main water manifold. This relationship was established by using the apparatus shown in FIGURE 5. In this apparatus, the pit or tank 45 is equipped with water supply conduit 47, rotameter 48, and connecting piping which supports a pair of spaced apart manifolds 46, each of which is provided with spaced apertures for delivering the dissolving water into the salt bed. Tank 45 is provided with a hopper having outwardly flaring sides for maintaining a reserve of rock salt in the dissolver, and the product brine is withdrawn through conduits 49 that extend across the tank parallel to its side walls. The bottom surface of the tank 45 is provided with a plurality of spaced apart channel shaped screens 51, each of which houses a manifold 53, the manifolds being connected to conduits 52. Conduits 52 are connected to a source of water supply with the velocity of flow measuring means associated therewith (not shown) similar in function to the second set of piping 13, 20, etc., of FIG. 1. Manifolds 53 are located to be equally spaced from vertical planes extending through each of the main water delivery manifolds 46. The bottom surface of the tank 45 is also provided with two channel shaped screens 54 that house manifolds 55, each of which is a connection to supply conduit 56 and these manifolds 55 lie in the same vertical plane which passes through each of the main water supply manifolds 46. The apparatus of FIG. 5 was used to dissolve rock salt on a continuous basis under the following comparative procedures.

In each of the runs, 3600 lbs. of No. 1 Louisiana rock salt was dissolved using a flow rate approximating 0.8 g.p.m. per sq. ft. and requiring about 36 hours. In Run No. 1, all of the dissolving water was introduced through manifolds 46, 95% of the brine was taken out through the apertured conduits 49 and 5% of the brine was taken out through manifolds 53 and conduits 52. Manifolds 55 were closed off during the run. The product brine removed from conduit 49 initially contained 150 p.p.m. calcium sulfate and at the end of the run contained 530 p.p.m. calcium sulfate. The 5% of the brine that was removed from manifolds 53 and conduit 52 initially contained 250 p.p.m. calcium sulfate and at the end of the run contained 3800 p.p.m. calcium sulfate. A blend of the two brine streams at the end of the run contained 690 p.p.m. calcium sulfate.

In the second run, 95% of the dissolving water was supplied through the main manifolds 46 and the other 5% of the water was introduced through manifolds 53 with all of the product brine being removed through brine outlet 49. The 3600 lbs. of salt was dissolved in 36 hours and during this time the product brine varied from a calcium sulfate content of 170 p.p.m. at the beginning of the run to 490 p.p.m. at the end of the run.

During the third run, 95% of the dissolving water was introduced through the main manifold 46 and 5% of the water input was fed through manifolds 55, located directly beneath the main manifolds 46. At the end of the 36-hour period, the product brine contained 310 parts per million calcium sulfate; thereafter, the dissolver was operated for an additional 31 hours, making a total of 67 hours, and at the end of this period, the product brine contained 500 p.p.m. calcium sulfate. At the conclusion of Run No. 3, another run was made in which all of the water was introduced to the bed through the three manifolds 53 and after one half hour, the product brine contained 670 p.p.m. calcium sulfate; after one hour, 822 p.p.m. calcium sulfate; after two hours, 955 p.p.m. calcium sulfate, and after 2½ hours, 1021 p.p.m. calcium sulfate, at which time the run was discontinued.

The modified apparatus shown in FIG. 6 comprises a dissolver tank 58 equipped with a vertically movable main water dissolving manifold 59 equipped with a plurality of spaced apertures along its length, and connected supply lines 61, 62 and 63, which is connected to a source of water, not shown. In this apparatus, the product brine is removed through the collecting manifold 49 near the top of tank 58. The vertically movable manifold 59 is positionable to any desired position relative to the bottom of the tank 58 and maintained in that position by any suitable holding means as set screws 65, extending through the wall of the bearing housing 67, mounted on the inner surface of the flaring end walls of the bin 68, carried on the top edge surfaces of tank 58. In operation, manifold 59 delivered a larger proportion of the total water dispensed in the right-hand end portion of that manifold as viewed in FIG. 6. The apparatus was operated to dissolve rock salt by filling the tank to a level below the discharge conduit 49. Manifold 59 was initially positioned at 1¼" above the bottom of the tank. As the dissolving operation continued the lower level of the manifold 59 was raised in ½" increments at intervals sufficient to maintain the manifold above the level of the developing calcium sulfate-containing sludge. It was found that as long as the lower surface of manifold 59 was maintained at least about ½" above the mean sludge level that the product brine contained a calcium sulfate content below about 500 parts per million.

It is apparent, therefore, that low calcium sulfate content brine can be continuously produced in a pit-type dissolver so long as the water supply being introduced into the salt-bed is maintained at a level which is spaced above the level of the sludge in that tank or pit. The relationship between the quantity of dissolving water and the build-up of sludge in the pit is illustrated in FIG. 7 from which it may be seen that the right-hand portion of the tank developed a layer of sludge 64 of approximately 6" in depth, whereas, at the other end of the tank where the rate of water flow was less the sludge level reached only about 3" in depth. For most efficient operations, it preferable to insure that the dissolving water is introduced to the bed in substantially equivalent quantities throughout the cross-section of the bed. A preferred apparatus for performing the method of this invention is that of FIG. 5 wherein the secondary water supply is provided by manifolds 55, that is, manifolds in substantial vertical alignment with the main water supply manifolds 46. It is to be understood, however, that the spacing between the main dissolving water manifolds and the number thereof are representative only and can be modified to accommodate the size and shape of specific commercial installations in accordance with the general suggestions set forth above, namely, that the main water supply manifolds should be closely spaced to insure uniform build-up of the level of the resultant calcium sulfate-containing sludge. It will be understood, additionally, that the vertically positionable manifold 59 of FIG. 6 can be advantageously employed in the apparatus illustratively shown in FIG. 5 and that such apparatus enables the practice of the method of this invention for maximized time periods between clean-outs.

What is claimed is:

1. In a method for dissolving rock salt wherein water is supplied to a bed of said salt and flows upwardly therethrough at a velocity sufficiently low such that calcium sulfate particles migrate downwardly through said bed and form a layer of calcium sulfate-containing sludge at the bottom portion of said bed, the improvement comprising the steps of introducing between about 90 to 98% of the total dissolving water at a first level maintained above the top level of said calcium sulfate-containing sludge and intermediate the bed, introducing the remaining portion of the dissolving water from a plurality of distribution zones at horizontally spaced intervals beneath the bed thereby causing the flow of a volume of liquid upwardly through that portion of said salt bed located beneath said first level equal to a minor portion of the total dissolving water, and removing brine solution near the top of said bed.

2. A method in accordance with claim 1, wherein the minor portion of the total dissolving water is introduced in locations substantially directly beneath the points of supply of the said major portion of the total dissolving water to said bed.

3. A method in accordance with claim 1, wherein the portion of said dissolving water introduced at said higher level is between about 92% and about 98% of the total dissolving water fed to said bed.

4. A method in accordance with claim 1, wherein the portion of said dissolving water introduced at said higher level is about 95% of the total dissolving water fed to said bed.

5. An apparatus having a substantially uniform cross section for dissolving rock salt containing calcium sulfate impurities comprising a receptacle for receiving a bed of said salt, product brine removal means on said receptacle and located near the top level of said receptacle, first water inlet means associated with said receptacle and located at a first level above the level of the bottom surface of said receptacle for causing liquid flow upwardly through said salt bed toward said brine removal means, second water inlet means associated with said receptacle and located at a second level adjacent to the bottom surface of said receptacle for causing liquid flow upwardly through the portion of said salt bed between said first and said second levels, wherein said first water inlet means includes a plurality of horizontally disposed manifolds, said manifolds being adjustable in height such that they may be maintained above accumulated calcium sulfate sludge, and wherein said second water inlet means includes a plurality of feeder manifolds each covered by horizontally disposed channel-shaped screens.

6. An apparatus as in claim 5 for dissolving rock salt wherein said water inlet manifolds extend transversely of said receptacle, support means on said receptacle supporting said manifold, said support means enabling the vertical level adjustment of said manifold in said receptacle.

7. An apparatus having a substantially uniform cross section for dissolving rock salt containing calcium sulfate impurities comprising a receptacle for receiving a bed of said salt, product brine removal means on said receptacle and located near the top level of said receptacle, first water inlet means associated with said receptacle and located at a first level above the level of the bottom surface of said receptacle for causing liquid flow upwardly through said salt bed toward said brine removal means, second water inlet means associated with said receptacle and located at a second level adjacent to the bottom surface of said receptacle for causing liquid to flow upwardly through the portion of said salt bed between said first and said second levels, and wherein said first water inlet means includes a plurality of water delivery manifolds horizontally positioned within said receptacle, means connected to said manifolds for adjusting the level thereof in said receptacle such that said manifold may be maintained above calcium sulfate sludge accumulation, and wherein said second water inlet means includes a plurality of horizontally spaced elongate water discharge means.

8. An apparatus having a substantially uniform cross section for dissolving rock salt containing calcium sulfate impurities comprising a receptacle for receiving a bed of said salt, product brine removal means on said receptacle and located near the top level of said receptacle, first water inlet means associated with said receptacle and located at a first level above the level of the bottom surface of said receptacle for causing liquid flow upwardly through said salt bed toward said brine removal means, said first water inlet means being adjustable in height so that it may be maintained above any calcium sulfate sludge accumulation second water inlet means associated with said receptacle and located at a second level adjacent to the bottom surface of said receptacle for causing liquid flow through the portion of said salt bed between said first and said second levels, wherein said first water inlet means include manifolds horizontally disposed at said first level and wherein said second liquid flow means includes feeder manifolds each covered by channel-shaped screens horizontally disposed at the bottom surface of the vessel.

9. The method as in claim 1 wherein the first level, at which said approximate amount of 90 to 98% of the total dissolving water is introduced, is adjusted to a level above the level of said calcium sulfate-containing sludge as the level of said sludge rises during the continuance of said dissolving method.

References Cited

UNITED STATES PATENTS

| | | | |
|---|---|---|---|
| 2,412,560 | 12/1946 | Bolton | 23—312 X |
| 3,071,450 | 1/1963 | Martin | 23—312 X |
| 3,130,016 | 4/1964 | Grier | 23—312 |
| 3,200,067 | 8/1965 | Levendusky | 23—270 X |
| 3,252,765 | 5/1966 | Cohen de Lara | 23—270 |

FOREIGN PATENTS

| | | |
|---|---|---|
| 637,912 | 3/1962 | Canada. |

NORMAN YUDKOFF, *Primary Examiner.*

S. EMERY, *Assistant Examiner.*

UNITED STATES PATENT OFFICE
CERTIFICATE OF CORRECTION

Patent No. 3,365,280 January 23, 1968

John F. Heiss et al.

It is certified that error appears in the above identified patent and that said Letters Patent are hereby corrected as shown below:

Column 8, line 22, after "to" insert -- about --.

Signed and sealed this 13th day of January 1970.

(SEAL)
Attest:

Edward M. Fletcher, Jr.
Attesting Officer

WILLIAM E. SCHUYLER, JR.
Commissioner of Patents